March 6, 1928. 1,661,631
M. C. NIXON
HUB FOR PROPELLER BLADES
Filed May 3, 1926
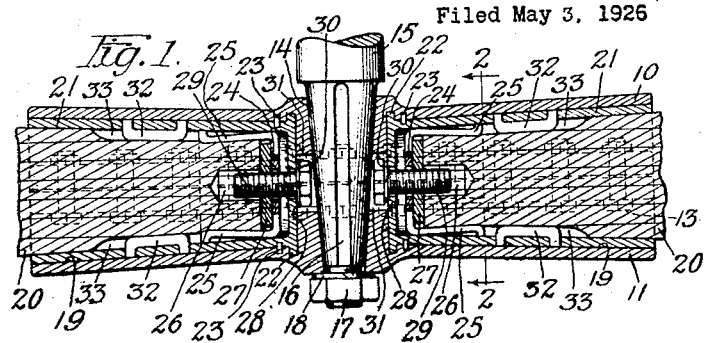 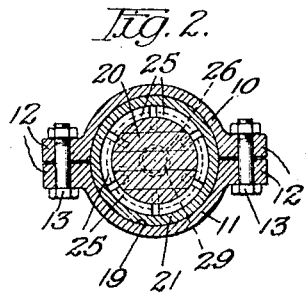
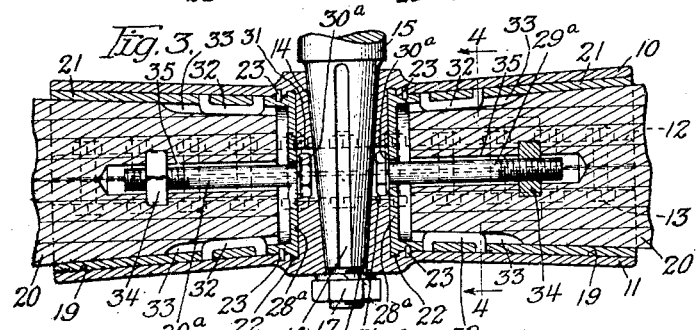 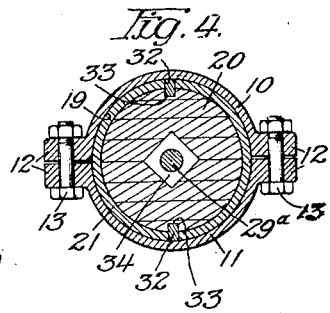
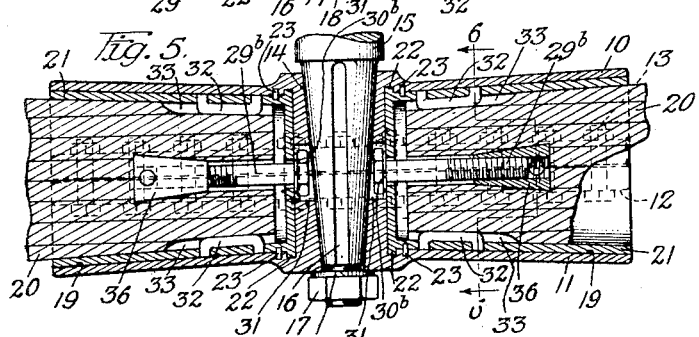 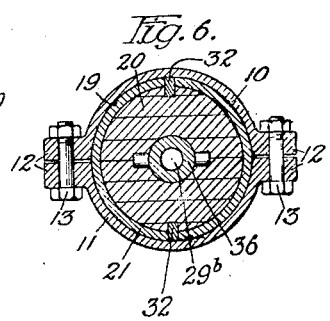
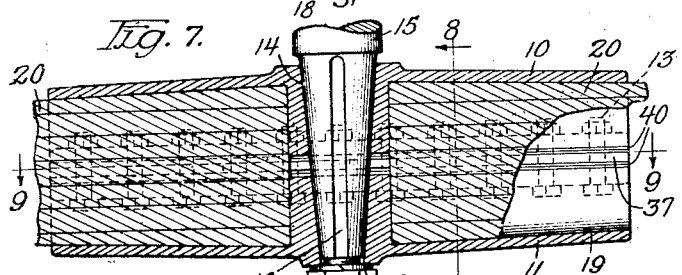 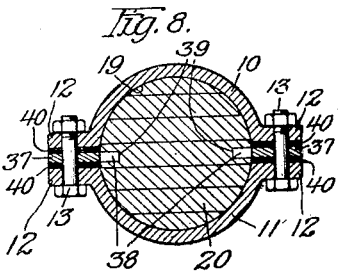
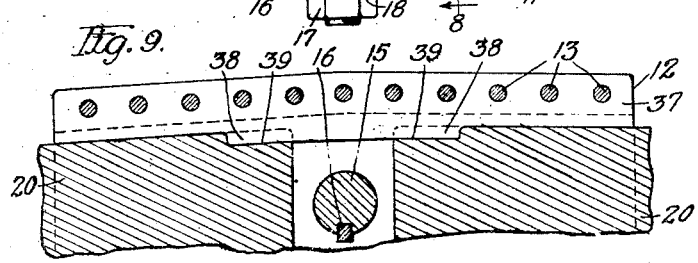
Inventor:
Moses C. Nixon Patented Mar. 6, 1928.

1,661,631

UNITED STATES PATENT OFFICE.

MOSES C. NIXON, OF CHICAGO, ILLINOIS.

HUB FOR PROPELLER BLADES.

Application filed May 3, 1926. Serial No. 106,430.

The invention relates to improvements in hubs for propeller blades; the objects being to provide an improved propeller and hub therefor in which the parts are so arranged that the blades may be built up in separate units and then secured to the hub; an improved split hub in which the parts thereof are adapted to be fastened together and to hold securely butt ends of individual propeller blades, and such other objects as may hereinafter appear; and consists, preferably, in the construction hereinafter described and illustrated, which may be varied without departing from the spirit of the invention.

In the drawings Figure 1 is a sectional view of construction embodying certain principles of the invention; Fig. 2 is a transverse sectional view taken on line 2—2 of Fig. 1; Fig. 3 is a sectional view illustrating a modified form of construction; Fig. 4 is a transverse sectional view taken on the line 4—4 of Fig. 3; Fig. 5 is a sectional view illustrating a further modified form of the invention; Fig. 6 is a transverse sectional view taken on the line 6—6 of Fig. 5; Fig. 7 is a sectional view of another modified construction; Fig. 8 is a transverse sectional view taken on the line 8—8 of Fig. 7, and Fig. 9 is a detail view taken on the line 9—9 of Fig. 7 illustrating certain features of construction shown in Figs. 7 and 8.

In the drawings similar numerals of reference indicate corresponding parts in the different views, and referring to the several figures of the drawings, it will be seen that the hub is of split construction and comprises the parts 10 and 11, which are provided with longitudinal and laterally extending flanges 12 disposed adjacent the respective faces of the hub parts, and perforated so that bolts 13 may extend therethrough for securing the hub parts together. The hub parts 10 and 11 may be of any suitable metal and are provided with a tapered bore 14 through which the spindle of the driving shaft 15 projects and the hub parts are secured thereon, as by key-way 16 with a mating key therein and a nut 17, the latter may be provided with a lock-washer 18 to prevent loosening thereof. It will be noted that the axis of the bore 14 is substantially at right angles to the meeting faces of the hub parts, the construction being such that when the nut 17 is tightened on the end of the spindle the taper of the latter and its nut aids materially in securing the hub sections together.

The cooperating parts are formed so as to provide radially extending sockets 19 in which the butt end of the respective propeller blades 20 are mounted. The propeller blades may be of any preferred construction, but those herein described are built up of laminations of wood, and referring to Figs. 1 to 6 inclusive, the butt end of each propeller blade is preferably tapered and extends into a tapered bore provided in a sleeve member or ferrule 21, which is formed externally to fit securely within its socket 19 of the hub. In order to prevent axial displacement of the sleeve 21 in its socket, the sleeve is provided with an outwardly extending rim 22 adapted to fit into a suitable groove in the socket. The sleeve and socket are preferably also provided with registering recesses or sockets in which a dowel pin 23 is disposed, which effectively prevents movement of the sleeve in its socket.

The means for securing the butt end of the propeller blade in its sleeve will now be described, and referring particularly to Figs. 1 and 2, a cap member 24 fits over the inner end of the blade and is provided with a plurality of fingers 25, which are disposed around the end of the blade, the latter being of less diameter where engaged by the outer ends of the fingers 25 than at its extreme inner end, the fingers being formed so their outer ends bear against the sides of the sleeve 21 and grip the blade at its smaller portion. The inner end of the blade is provided with a pocket 26, and a nut 27 is interposed between the inner end of the blade and the underside of the cap member 24; and the inner end of the sleeve 21 is provided with a bridge portion 28, which is perforated so that a screw 29 may be passed therethrough and through an opening in the cap member 24, the screw having threaded engagement with the nut 27. A lock-washer 30 may be inserted under the head of the screw to prevent any loosening thereof; and hub parts are provided with suitable recesses 31 to receive the heads of the screws. In order to prevent rotative movement of the blades relative to the present embodiment keys 32 are carried by each of the sleeves and extend into suitable keyways 33 that are provided for in the sides of the propeller blades.

In assembling the parts the cap member 24 is placed over the inner end of the propeller blade, with the nut 27 between, and they are all forced firmly into the sleeve 21. The screw 29 is then inserted and upon turning it home the cap member 24 is drawn further into the sleeve, which forces the extremities of fingers 25 into gripping engagement with the propeller blade, which results in the blade being drawn securely into the sleeve with the cap member. It is quite apparent that this construction readily lends itself to a very secure anchoring of the butt end of the blade in the sleeve.

The construction shown in Figs. 3 and 4 is quite similar to that heretofore described: In this last named construction a pocket is provided in each of the propeller blades in which a nut 34 is placed when the blade is being built. A screw 29ª extends through an opening in the bridge portion 28ª in the end of the sleeve 21, and an opening 35 in the propeller blade and has threaded engagement with the nut 34. It will be obvious that upon tightening the screw 29ª the butt end of the propeller blade will be securely drawn into and held within the sleeve 21, the head of the screw may be provided with a lock-washer to prevent any loosening thereof.

The construction shown in Figs. 5 and 6 is also similar to the two constructions hereinbefore described. In this last named construction a nut 36 is disposed in the butt end of the propeller blade as the latter is built. A screw 29ᵇ carried by the sleeve has threaded engagement with the nut 36, the outer surface of the latter being tapered as clearly shown in Fig. 5. In assembling the parts the sleeve is forced tightly down over the end of the blade and then the screw is inserted, the head of which may be provided with a lock-washer 30ᵇ to prevent any loosening thereof. Tightening the screw draws the nut 36 toward the inner end of the sleeve and inasmuch as the outer surface of the nut is tapered the inner end of the blade tends to spread and to grip more firmly the sides of the sleeve. The construction of the parts is such that the tendency for the wood of the blade ahead of the nut to pull out is minimized by the spreading action of the nut.

In the constructions hereinbefore described the sockets for the propeller blades formed in the cooperating hub parts are tapered, the smaller end of the socket being adjacent the axis of rotation of the hub. In the construction shown in Figs. 7, 8 and 9 the sockets formed in the cooperating hub parts are also tapered but in the last named construction the sockets at their inner ends are considerably larger in diameter than they are at their outer ends. The butt ends of the propeller blades are correspondingly formed to fit snugly in the sockets when the hub parts are secured together. It will be obvious that in such a construction the sockets of the hub parts will take a very reliable grip on the butt ends of the blades when the hub parts are secured together. In order to prevent any turning movement of the blades in the sockets shims 37 co-extensive with and between the flanges of the cooperating hub parts 10 and 11 are provided. Portions 38, of the shims 37, near the inner end of each of the sockets extend inwardly into suitable grooves 39 provided in the sides of the respective blades. One or more thin shims 40 between the main shims 37 and the respective flanges of the hub parts are provided, so that if there is any shrinkage of the butt end of the blade, one or more of the thin shims may be removed, which permits the hub parts to be drawn closer together and more securely about the end of the blade.

While several modifications have been shown and explained it is evident that there may be other modifications and changes made without departing from the spirit of the invention, and I do not, therefore, confine myself to the details of construction herein set forth.

I claim:

1. In combination a hub comprising cooperating elements secured together and adapted to be secured on a driving shaft and having a radially extending socket member substantially circular in cross section, a propeller member, and means for securing the propeller member in said socket member, one of said members having a projecting member and the other of said members having a groove extending longitudinally therewith adapted to receive said projecting part thereby preventing turning but permitting longitudinal movement of the propeller member in the socket member.

2. In combination a split hub comprising cooperating members secured together and adapted to be secured on a driving shaft and having a radially extending socket, substantially circular in cross section, and a propeller blade secured in said socket, said socket carrying a longitudinally and inwardly extending key and said propeller blade having a groove adapted to receive said key to prevent turning but permitting longitudinal movement of the blade in the socket.

3. In combination a hub comprising cooperating members secured together and adapted to be secured on a driving shaft and having a radially extending longitudinally split socket, a sleeve adapted to be clamped in said socket and having a tapered bore, the smaller end of said bore being adjacent the axis of rotation, a propeller blade, and means for securely drawing the butt end of the propeller blade into said sleeve.

4. In combination a hub comprising cooperating members secured together and adapted to be secured on a driving shaft and having a radially extending longitudinally split socket, a sleeve adapted to be clamped in said socket and having a tapered bore, the smaller end of said bore being adjacent the axis of rotation, a propeller blade, a nut secured in the butt end of the blade, and a screw carried by the sleeve for engaging the nut thereby securing the blade within the sleeve.

5. In combination a hub comprising cooperating elements secured together and adapted to be secured on a driving shaft and having a radially extending longitudinally split socket member, a sleeve member adapted to be clamped in said socket, said members having co-engaging portions adapted to prevent axial relative movement, said sleeve having a tapered bore with its smaller end adjacent the axis of rotation, a propeller blade, and means for securely drawing the butt end of the propeller blade into said sleeve.

6. In combination a hub comprising cooperating elements secured together and adapted to be secured on a driving shaft and having a radially extending longitudinally split socket member, a sleeve member adapted to be clamped in said socket, said members having co-engaging portions adapted to prevent axial relative movement, said sleeve having a tapered bore with its smaller end adjacent the axis of rotation, a propeller blade, a nut carried by the butt end of the propeller blade, and a screw mounted on the sleeve for engaging said nut and thereby drawing the blade securely into the sleeve.

7. In combination a split hub comprising cooperating members secured together and adapted to be secured on a driving shaft and having a radially extending socket, a sleeve member secured in said socket, a propeller blade member the butt end of which is disposed within said sleeve, and co-engaging means between the sleeve and the butt end of the propeller blade extending longitudinally of the blade to prevent turning but permitting longitudinal movement of the blade in the sleeve.

8. In combination a split hub comprising cooperating members secured together and adapted to be secured on a driving shaft and having a radially extending socket, a sleeve member secured in said socket, a propeller blade member the butt end of which is disposed within said sleeve, one of said members having a key and the other of said members having a groove extending longitudinally therewith adapted to receive said key for preventing turning but permitting longitudinal movement of the propeller member in the sleeve member.

9. In combination a split hub comprising cooperating elements secured together and adapted to be secured on a driving shaft and having a radially extending socket member, a sleeve member clamped in said socket member, said members having co-engaging portions adapted to prevent rotative movement of the sleeve member relative to the socket member, a propeller blade, and means for securing the butt end of the propeller blade in said sleeve member.

10. In combination a split hub comprising cooperating elements secured together and adapted to be secured on a driving shaft and having a radially extending socket member, a sleeve member adapted to be clamped in said socket member, said members having co-engaging portions adapted to prevent axial and rotative movement of the sleeve member relative to the socket member, a propeller blade and means for securing the butt end of the propeller blade in said sleeve member.

11. In combination a split hub comprising cooperating members secured together and adapted to be secured on a driving shaft and having a radially extending socket, a sleeve adapted to be clamped in said socket and having a tapered bore, the smaller end of said bore being adjacent the axis of rotation, a propeller blade, a cap member disposed over the butt end of the propeller blade and having axially extending fingers disposed at the sides of the propeller blade, and means for securely drawing the cap member and butt end of the propeller blade into said sleeve, said fingers being so arranged that their inward movement into the sleeve causes them to take an increased grip on the propeller blade.

12. In combination a split hub comprising cooperating members secured together and adapted to be secured on a driving shaft and having a radially extending socket, a sleeve adapted to be clamped in said socket and having a tapered bore, the smaller end of said bore being adjacent the axis of rotation, a propeller blade, a cap member disposed over the butt end of the propeller blade and having axially extending fingers disposed at the sides of the propeller blade, that part of the propeller blade engaged by the extremities of said fingers being of less diameter than the inner extremity of the blade, and means for securely drawing the cap member and butt end of the propeller blade into said sleeve, said fingers being so arranged that inward movement of said cap member and the blade into the sleeve causes the fingers to take an increased grip on the propeller blade.

13. In combination a split hub comprising cooperating members secured together and adapted to be secured on a driving shaft and having a radially extending socket, a sleeve adapted to be clamped in said socket and having a tapered bore, the smaller end of said bore being adjacent the axis of rotation, a propeller blade, a cap member disposed over the butt end of the propeller blade and having axially extending fingers disposed at the sides of the propeller blade, the extremities of said fingers being turned outwardly to bear on the walls of the sleeve, and means for securely drawing said cap member and the butt end of the propeller blade into said sleeve, said fingers being so arranged that their inward movement into the sleeve causes them to take an increased grip on the propeller blade.

14. In combination a split hub comprising cooperating members secured together and adapted to be secured on a driving shaft and having a radially extending socket, a sleeve adapted to be clamped in said socket and having a tampered bore, the smaller end of said bore being adjacent the axis of rotation, a propeller blade, a cap member disposed over the butt end of the propeller blade and having axially extending fingers disposed at the sides of the propeller blade, the extremities of said fingers being turned outwardly to bear on the walls of the sleeve, that part of the propeller blade engaged by the extremities of said fingers being of less diameter than the inner extremity of the blade, and means for securely drawing said fingers and the butt end of the propeller blade into said sleeve and thereby causing the fingers to take an increased grip on the propeller blade.

15. In combination a split hub comprising cooperating members secured together and adapted to be secured on a driving shaft and having a radially extending socket, a sleeve adapted to be clamped in said socket and having a tapered bore the smaller end of said bore being adjacent the axis of rotation, a propeller blade, a plurality of axially extending fingers arranged around the butt end of the blade, and means for securely drawing said fingers and the butt end of the blade into said sleeve, said fingers being so arranged that inward movement of said fingers and the blade into the sleeve causes the fingers to take an increased grip on the blade.

16. In combination a split hub comprising cooperating members secured together and adapted to be secured on a driving shaft and having a radially extending socket, a sleeve adapted to be clamped in said socket and having a tapered bore the smaller end of said bore being adjacent the axis of rotation, a propeller blade, a plurality of axially extending fingers arranged around the butt end of the blade, that part of the propeller blade engaged by the outer ends of said fingers being of less diameter than the inner extremity of the blade, and means for securely drawing said fingers and the butt end of the propeller blade into said sleeve, said fingers being so arranged that their inward movement into the sleeve causes the fingers to take an increased grip on the blade.

17. In combination a split hub comprising cooperating members secured together and adapted to be secured on a driving shaft and having a radially extending socket, a sleeve adapted to be clamped in said socket and having a tapered bore the smaller end of said bore being adjacent the axis of rotation, a propeller blade, a plurality of axially extending fingers arranged around the butt end of the blade, the outer ends of said fingers being turned outwardly to bear on the walls of the sleeve, and means for securely drawing said fingers and the butt end of the propeller blade into said sleeve, said fingers being so arranged that their inward movement into the sleeve causes the fingers to take an increased grip on the propeller blade.

18. In combination a split hub comprising cooperating members secured together and adapted to be secured on a driving shaft and having a radially extending socket, a sleeve adapted to be clamped in said socket and having a tapered bore the smaller end of said bore being adjacent the axis of rotation, a propeller blade, a plurality of axially extending fingers arranged around the butt end of the blade, the outer ends of said fingers being turned outwardly to bear on the walls of the sleeve, that part of the propeller blade engaged by the outer ends of said fingers being of less diameter than the inner extremity of the blade, and means for securely drawing said fingers and the butt end of the propeller blade into the sleeve and thereby causing the fingers to take an increased grip on the propeller blade.

19. In combination a hub comprising cooperating members secured together and adapted to be secured on a driving shaft and having a radially extending longitudinally split socket, a sleeve adapted to be clamped in said socket and having a tapered bore, the smaller end of said bore being adjacent to the axis of rotation, a propeller blade, said blade having a pocket in its inner end in which a nut is disposed, a screw carried by the sleeve and having threaded engagement with said nut whereby the butt end of the blade may be drawn securely into said sleeve.

20. In combination a hub comprising cooperating members secured together and adapted to be secured on a driving shaft and having a radially extending longitudinally split socket, a sleeve adapted to be clamped in said socket and having a tapered bore, the smaller end of said bore being adjacent to the axis of a rotation, a propeller blade, said blade having a pocket in its inner end in which a nut is disposed, said nut having its outer surface tapered, and a screw carried by the sleeve and having threaded engagement with the nut, said nut being so arranged that upon tightening the screw the butt end of the blade is drawn securely into the sleeve.

21. In combination, a split hub comprising cooperating elements secured together and adapted to be secured on a driving shaft and having a radially extending socket member, a sleeve member adapted to be clamped in said socket member and to receive the butt end of a propeller blade, a propeller blade comprising a plurality of laminated sections and formed with a pocket, a nut disposed in said pocket before the sections of the blade are secured together, said blade and sleeve member having passageways in alignment with said nut, and bolt means projecting through said passageways and engaging the nut for drawing the butt end of the blade firmly into the sleeve member.

22. In combination, a split hub comprising cooperating elements secured together and adapted to be secured on a driving shaft and having a radially extending socket member, a sleeve member clamped in said socket member and adapted to receive the butt end of a propeller blade, a propeller blade comprising a plurality of laminated sections and formed with a pocket, a nut disposed in said pocket before the sections of the blade are secured together, said blade and sleeve member having passageways in alignment with said nut, and bolt means projecting through said passageways and engaging the nut for drawing the butt end of the blade firmly into the sleeve.

23. In combination, a hub comprising cooperating elements secured together and adapted to be secured on a driving shaft and having a radially extending longitudinally split socket member, a sleeve member clamped in said socket and having a tapered bore, the smaller end of said bore being adjacent the axis of rotation, and adapted to receive the butt end of the propeller blade, a propeller blade comprising a plurality of laminated sections and provided with an axial passageway in the butt end thereof which terminates at its inner end in an enlarged pocket, said sleeve member having an opening registering with said passageway, and bolt means carried by said sleeve member and blade and adapted to draw the butt end of the blade firmly into the sleeve member, said bolt means being placed in the blade before the sections of the blade are secured together.

24. In combination, a split hub comprising cooperating elements secured together and adapted to be secured on a driving shaft and having a radially extending socket member, a sleeve member clamped in the socket member and having a tapered bore, the smaller end of said bore being adjacent the axis of rotation, and formed to receive the butt end of a propeller blade, a propeller blade comprising a plurality of laminated sections and provided with an axial passageway in the butt end thereof which terminates at its inner end in an enlarged pocket, said sleeve member having an opening registering with said passageway, and bolt means carried by said sleeve member and blade and adapted to draw the butt end of the blade firmly into the sleeve member, a portion of said bolt means being placed in the blade before the sections of the blade are secured together.

25. In combination, a split hub comprising cooperating elements secured together and adapted to be secured on a driving shaft and having a radially extending socket member, a sleeve member clamped in the socket member and formed to receive the butt end of a propeller blade, a propeller blade comprising a plurality of laminated sections and provided with an axial passageway in the butt end thereof, said sleeve member having an opening registering with said passageway, and means carried by said sleeve member and blade and adapted to draw the butt end of the blade into said sleeve member, a portion of said means being placed in the blade before said sections are secured together.

26. In combination, a split hub comprising cooperating elements secured together and adapted to be secured on a driving shaft and having a radially extending socket member, a sleeve member clamped in the socket member and having a tapered bore, the smaller end of said bore being adjacent the axis of rotation, and formed to receive the butt end of a propeller blade, a propeller blade comprising a plurality of laminated sections and provided with an axial passageway in the butt end thereof, said passageway having a pocket near its inner end, said sleeve member having an opening registering with said passageway, and bolt means carried by said sleeve member and blade and adapted to draw the butt end of the blade into the sleeve member, a portion of said bolt means being placed in the blade before said sections are secured together.

27. In combination, a split hub comprising cooperating elements secured together and adapted to be secured on a driving shaft and having a radially extending socket member, a sleeve member clamped in the socket member and formed to receive the butt end of a propeller blade, a propeller blade comprising a plurality of sections, and means carried by said sleeve member and propeller blade adapted to draw the butt end of the blade into said sleeve member, a portion of said means being placed in the blade before said sections are secured together.

28. In combination a split hub comprising cooperating members secured together and adapted to be secured on a driving shaft and having a radially extending longitudinally split socket member, a sleeve clamped in said socket member, a propeller blade, a nut disposed within the hub of said blade, a screw carried by the sleeve and having threaded engagement with said nut thereby permitting securing the hub of the blade within the sleeve before securing the hub parts together.

29. In combination a split hub comprising cooperating members secured together and adapted to be secured on a driving shaft and having a radially extending longitudinally split socket member, a sleeve clamped in said socket member, a propeller blade, a nut disposed within the butt end of said blade, said nut having its outer surface tapered, and a screw carried by the sleeve and having threaded engagement with said nut, said nut and screw being so arranged that upon tightening the screw the butt end of the blade will be securely drawn into the sleeve before securing the hub parts together.

30. In combination a split hub comprising cooperating members secured together and adapted to be secured on a driving shaft and having a radially extending longitudinally split socket member, a sleeve secured in said socket member, a propeller blade, bolt means carried by said sleeve and the propeller blade adapted to draw the butt end of the propeller blade into the sleeve.

31. In combination a hub comprising cooperating elements secured together and adapted to be secured on a driving shaft and having a radially extending member substantially circular in cross section, a propeller member, means for securely drawing the butt end of the propeller member into the socket member, one of said members having a groove extending longitudinally therewith and adapted to receive said projecting part thereby preventing turning but permitting longitudinal movement of the propeller member in the socket member.

32. In combination a propeller hub adapted to be secured on a driving shaft and having a radially extending socket member, and a propeller member secured in said socket, one of said members having a projecting part and the other of said members having a groove extending longitudinally therewith adapted to receive said projecting part thereby preventing turning but permitting longitudinal movement of the propeller member in the socket member.

33. In combination a hub adapted to be secured on a driving shaft and having a radially extending longitudinally split socket, a sleeve clamped in said socket, a propeller blade, a cap member having extending fingers disposed at the sides of the butt end of the propeller blade, said fingers bearing against the inner wall of the sleeve, and means for drawing the cap member and the butt end of the blade into the sleeve whereby said fingers are caused to take an increased grip on the butt end of the blade for securely drawing it into the sleeve.

34. In combination a hub adapted to be secured on a driving shaft and carrying a radially extending sleeve, the smaller end of said sleeve being adjacent the axis of rotation, a propeller blade, a cap member having axially extending fingers disposed at the sides of the butt end of the blade, said fingers bearing against the inner wall of said sleeve, and means for drawing the cap member and the butt end of the propeller blade into said sleeve whereby the pressure of said wall against the fingers causes the latter to take increased grip on the propeller blade for securely drawing the latter into the sleeve.

35. In combination a hub comprising cooperating elements secured together and adapted to be secured on a driving shaft and having a radially extending socket member, and a propeller member secured in said socket member, one of said members having a projecting part and the other member a groove extending longitudinally therewith adapted to receive said projecting part thereby preventing turning but permitting longitudinal movement of the propeller blade in the socket member.

36. In combination a hub comprising cooperating elements secured together and adapted to be secured on a driving shaft and having a radially extending socket member, a propeller member having its butt end secured in said socket member, and coengaging means carried by said members to prevent turning but permitting longitudinal movement of the propeller member in the socket.

37. In combination, a split hub, comprising cooperating members secured together and adapted to be secured on a driving shaft and having a radially extending socket member, a bolt having head and nut members, a propeller blade, a sleeve adapted to be clamped in said socket member and to receive the butt end of the propeller blade having its butt end formed around one of said bolt members and adapted to be inserted in said sleeve, the butt end of said blade having an axial passageway which leads to said bolt member therein and which registers with an opening provided in the inner end of the sleeve, the bolt stem extending through said opening and said passageway and being connected with the bolt member in the blade and with the other bolt member at the end of the sleeve, whereby the blade may be firmly drawn into the sleeve.

38. In combination, a split hub comprising cooperating members secured together and adapted to be secured on a driving shaft and having a radially extending socket, a sleeve adapted to be clamped in said socket and to receive the butt end of a propeller blade, a nut, a propeller blade having its butt end formed around the nut and adapted to be inserted in said sleeve, the butt end of said blade having an axial passageway which leads to said nut and registering with an opening provided in the inner end of the sleeve, and a bolt stem having a head thereon and extending through said sleeve opening into said passageway and threaded into said nut for securing the butt end of the propeller blade firmly in said sleeve.

39. In combination, a hub comprising co-operating elements secured together and adapted to be secured on a driving shaft and having a radially extending split socket member, a sleeve member adapted to be clamped in said socket, a propeller blade, and coacting means carried by said sleeve and the propeller blade for drawing the butt end of the propeller blade securely into the sleeve member.

40. In combination, a hub comprising co-operating elements secured together and adapted to be secured on a driving shaft and having a radially extending split socket member, a sleeve member adapted to be clamped in said socket and having a tapered bore the smaller end of said bore being adjacent the axis of rotation, a propeller blade, and coacting means carried by said sleeve and the propeller blade for drawing the butt end of the propeller blade securely into the sleeve member.

41. In combination, a hub adapted to be secured on a driving shaft and having a radially extending split socket member, a sleeve member adapted to be clamped in said socket member, a propeller blade, and coacting means carried by said sleeve and the propeller blade for drawing the butt end of the propeller blade into the sleeve member and securing it therein.

MOSES C. NIXON.